United States Patent [19]
Carder

[11] 3,990,557
[45] Nov. 9, 1976

[54] INDEX RACK FRONT STOP ASSEMBLY

[75] Inventor: Victor H. Carder, Carmel, Calif.

[73] Assignee: Cochran Airport Systems, San Francisco, Calif.

[22] Filed: May 12, 1975

[21] Appl. No.: 576,329

[52] U.S. Cl. .......................... 193/35 A; 187/8.52; 214/38 CC; 214/89
[51] Int. Cl.² .............................. B65G 13/00
[58] Field of Search .............. 193/32, 35 A, 40; 214/38 CC, 84, 89; 187/8.52, 97; 221/289, 296, 301

[56] References Cited
UNITED STATES PATENTS

| | | | |
|---|---|---|---|
| 1,400,894 | 12/1921 | Mason | 193/40 X |
| 1,487,573 | 3/1924 | Ingram | 193/40 X |
| 1,946,320 | 2/1934 | Hollister | 187/8.52 |
| 2,098,376 | 11/1937 | Cunneen | 187/8.52 |
| 2,569,982 | 10/1951 | Estel | 187/8.52 |
| 2,842,243 | 7/1958 | Neidhardt | 193/40 |
| 3,435,969 | 4/1969 | McCartney | 214/84 |

Primary Examiner—Evon C. Blunk
Assistant Examiner—James L. Rowland
Attorney, Agent, or Firm—Naylor, Neal & Uilkema

[57] ABSTRACT

An improved front stop assembly is provided for index racks which are used to stow aircraft freight pallets. The stop member of the front stop assembly is raised or lowered, respectively, by the movement of a pallet transporter out of docking relation with the rack and by the movement of the transporter into docking relation therewith.

2 Claims, 6 Drawing Figures

INDEX RACK FRONT STOP ASSEMBLY

The general object of the invention is to provide a new and improved front stop assembly of the type described which is free of the drawbacks of the prior known and used stop assemblies of this type.

The specific advantages of the stop assembly of the invention will be set forth in the following description taken in conjunction with the drawings forming part of this specification, and in which.

Figure 1:
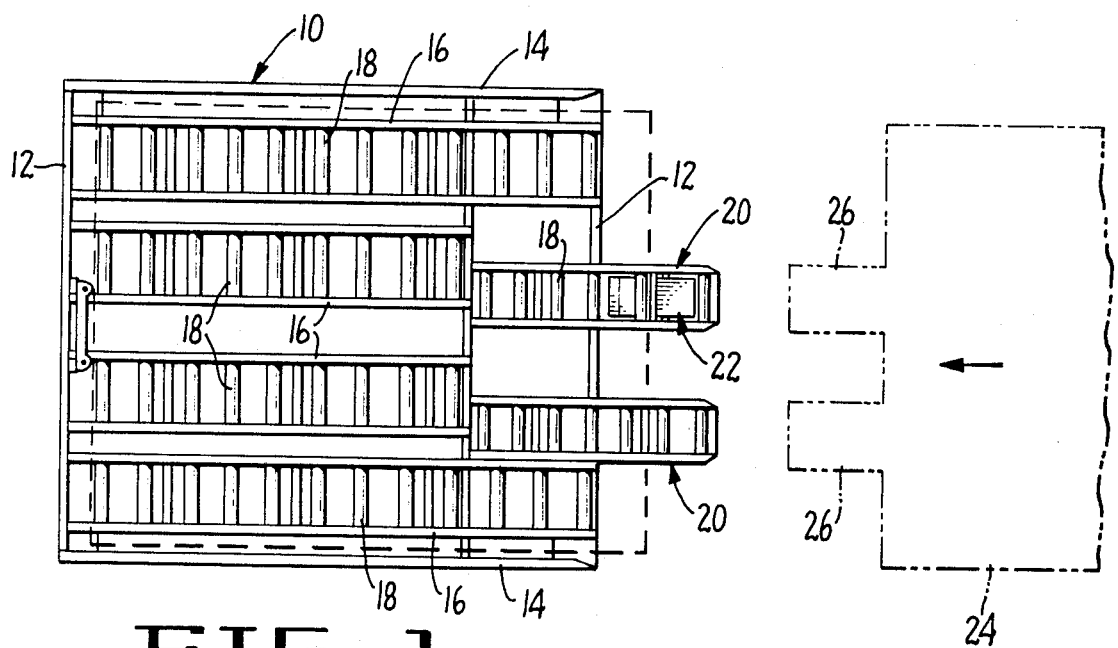
FIG. 1 is a top plan view showing an index rack with the improved stop assembly of the invention in solid outline and showing in dotted outline a pallet transporter about to dock with the index rack.

With reference, first, to FIG. 1, there is shown a freight pallet index rack 10 comprised of frame members 12 and 14 and roller support channel members 16 supporting conveyor roller elements 18. The rack is provided with front-end conveyor sections indicated generally at 20, one of which is provided with the improved front-end stop assembly 22 of the invention. FIG. 1 also shows a pallet transporter 24 provided with extension portions 26 adapted to be moved into underlying relation with the conveyor sections 20 of the index rack, thereby disposing the transporter in docked or pallet-transfer relation to the index rack.

The front stop assembly 22 is comprised of a pair of channel members 16, a shaft 28 journalled for rotative movement in the channel members 16, a shaft 30 journalled for rotation in channel members 16, a pair of arm members 32 fixedly secured to shaft 28, a counterweight plate 34 fixedly attached to the arms 32, a ramp plate 36 having a pair of side plates 38 fixedly attached to shaft 30, an operating connection between the arms 32 and the side plates 38 comprising rod 40 carried by the arms and extending through elongated slots 42 formed in the side plates 38, a flange 44 at the front end of the ramp plate 36, and a stop plate 46 having a hinge connection 48 with the flange 44. The assembly further comprises rods 50 and 52. Rod 50 serves as a retainer and guide for the hinge plate or flap 46, keeping it out of engagement with the adjacent conveyor roller 18. Rod 52 cooperates with shaped cutouts 54 in the ramp side plates 38 whereby the rod 52 supports the ramp assembly in the down position (FIG. 6) and serves as a stop member to limit upward movement of the ramp assembly to the position shown in FIG. 5.

Figure 2:
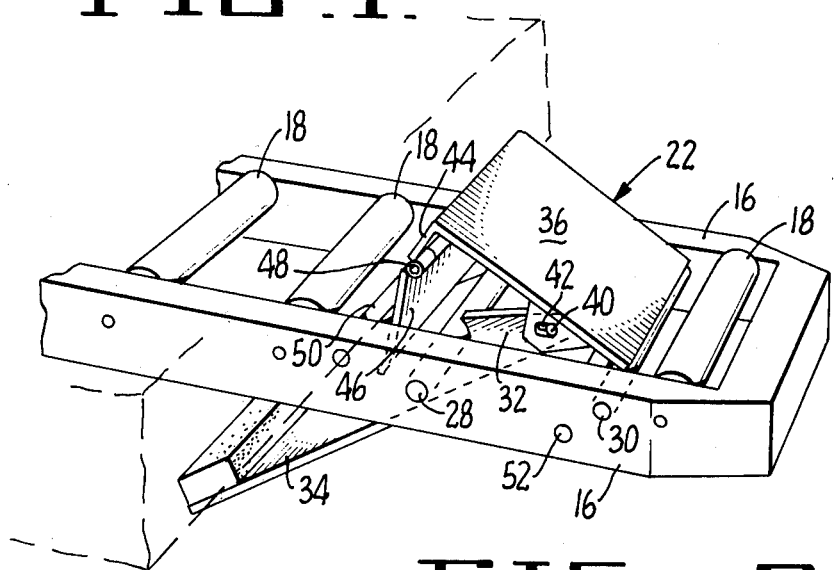
FIG. 2 is an enlarged view in perspective of the front stop assembly of the invention, the stop being shown in raised position and a stopped pallet being shown in dotted outline.
Figure 3:
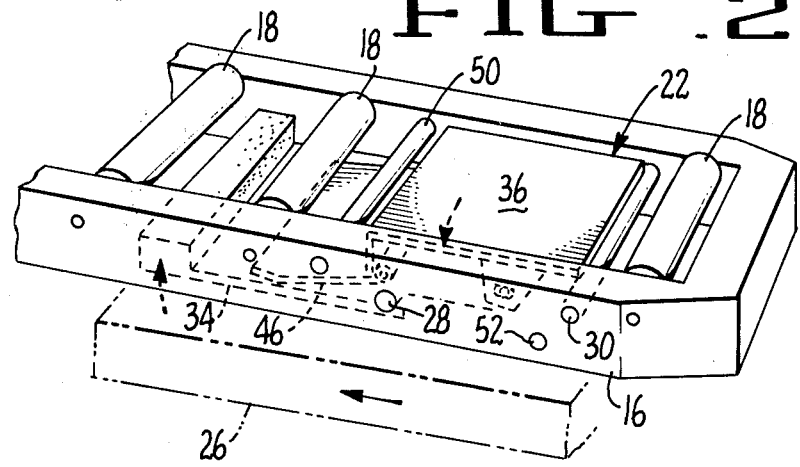
FIG. 3 is a view of the type of that of FIG. 2, the stop being shown in lowered position and a portion of the pallet transporter being shown in dotted outline.
Figure 4:
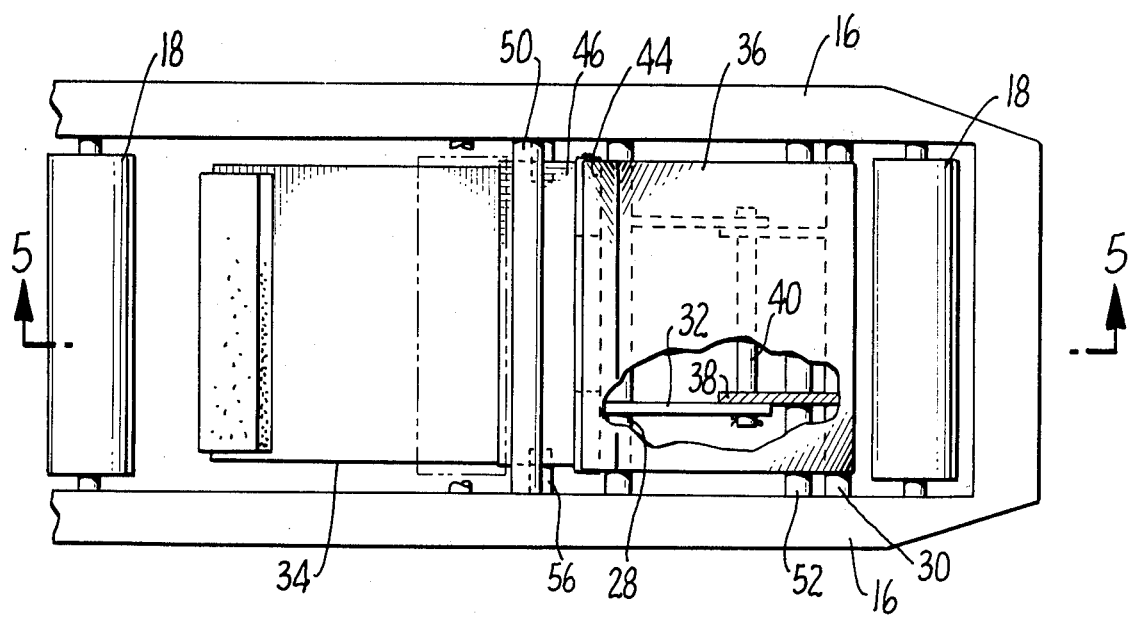
FIG. 4 is a top plan view of the stop assembly in the condition of that of FIG. 2.
Figure 5:
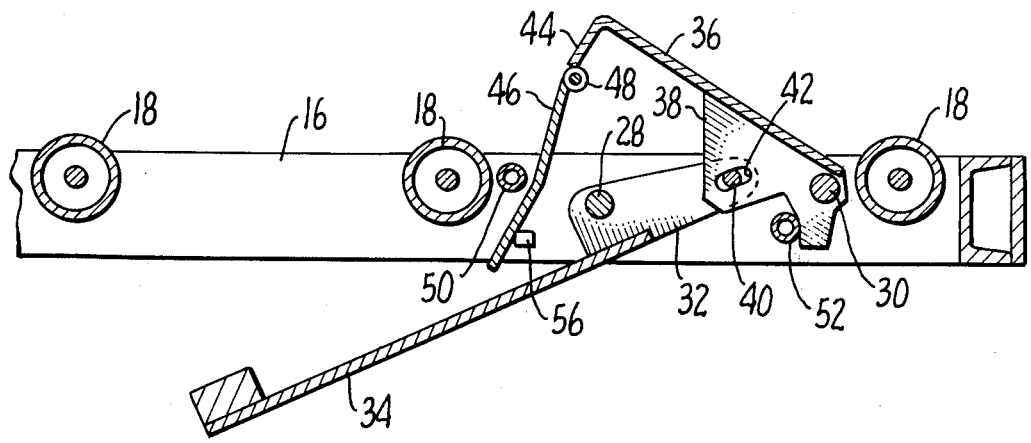
FIG. 5 is a view taken along lines 5—5 of FIG. 4.

The normal position of the stop assembly is shown in FIGS. 2 and 5. The ramp 36 along with the hinged stop plate 46 are held in the raised position under the dead weight action of the counterweight plate 34. Pallets on the index rack 10 to the left of the stop assembly are prevented by stop plate 46 from moving off of the rack. Any thrust exerted by the pallets against the plate 46 is absorbed by the plate and the plate stop member 56. The plate 46 serves to protect the balance of the stop assembly, particularly the ramp plate 36 and the shaft 30 against damage by the pallets and it serves also to protect the pallets against damage by the stop assembly.

Figure 6:
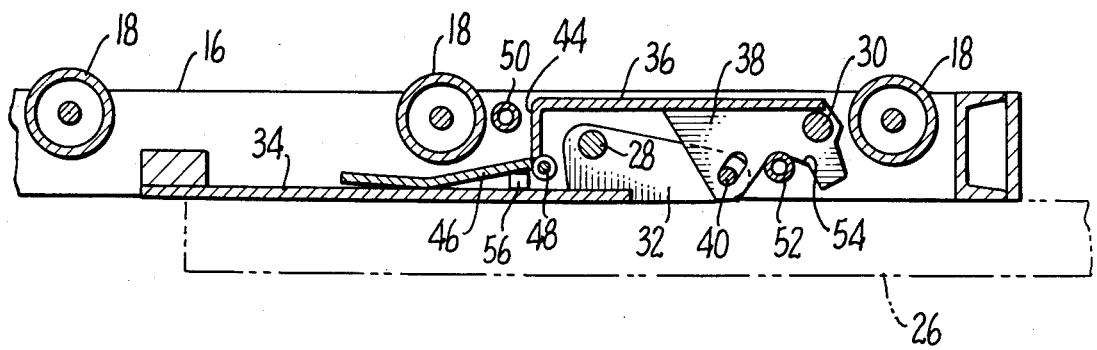
FIG. 6 is a view similar to that of FIG. 5 but showing the stop assembly in non-stop condition.

FIG. 6 illustrates the condition of the stop assembly when the transporter 24 is docked with the index rack 10 and the transporter extensions 26 have moved underneath the index rack extensions 20. As the extensions 26 move beneath the extensions 20 plate 34 is swung upwardly to thereby cause the ramp plate 36 to be swung downwardly to the position shown in FIG. 6.

What is claimed is:

1. For pallet conveyor index racks, a stop assembly comprising a ramp plate having front and rear ends, means including a conveyor roller support frame for supporting said plate for pivotal movement adjacent the rear end thereof, a pallet stop plate pivotally connected in depending relation to said ramp plate adjacent the front end thereof, a lever, means supporting said lever for pivotal movement, means connecting said lever to said ramp plate so that pivotal movement of said lever in one direction imparts pivotal movement to said ramp plate in the other direction, said lever having an elongated arm serving as a counterweight for said ramp plate operable upon counterclockwise pivotal movement under the influence of gravity to impart clockwise pivotal movement to said ramp plate and thereby raise said stop plate to a pallet-stopping position.

2. The stop assembly of claim 1 including a stop member carried by said frame operable to support and restrain the lower end of said stop plate when said stop plate is in its raised pallet-stopping position.

* * * * *